2,993,917
NEW ANTHRAQUINONE DYESTUFFS AND A PROCESS FOR THEIR PREPARATION

Georges Weinstein and Louis Woerth, Creil, and René Eugene Marcel Gangneux, Rouen, France, assignors to Compagnie Française des Matieres Colorantes, Paris, France, a French company
No Drawing. Filed Jan. 5, 1959, Ser. No. 784,853
Claims priority, application France Feb. 14, 1958
1 Claim. (Cl. 260—373)

The present invention concerns improvements in anthraquinone dyestuffs and a process for their preparation. In particular it relates to new dyestuffs of the following general formula:

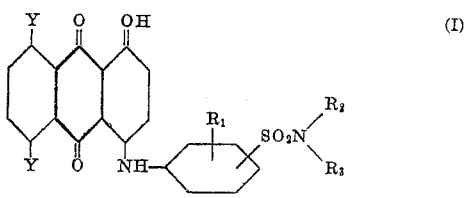

in which $R_1$ represents a hydrogen atom or an alkyl or alkoxy group, $R_2$ and $R_3$ represent hydrogen atoms or alkyl groups of low molecular weight containing, for example, 1 to 4 atoms of carbon, one Y represents a hydroxyl group and the other an amino group.

These dyestuffs may be prepared by condensation of 4:5-dinitro-chrysazin or 4:8-dinitro-anthrarufin with a compound of the general formula:

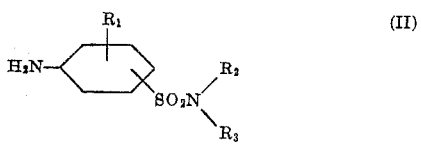

in which $R_1$, $R_2$ and $R_3$ have the same significance as above. This condensation can be carried out either in the presence of an inert solvent, such as nitrobenzene, at temperatures between 150 and 210° C., or in the presence of a large excess of the amine used as solvent. Even in the first case, the proportions of amine may vary within wide limits. The use of 2 to 3 moles of amine per mole of dinitro-dihydroxyanthraquinone gives excellent results. It is also possible to start from mixtures of 4:5-dinitro-chrysazin and 4:8-dinitro-anthrarufin in any proportions whatever, for example, 1/1, 3/1 or 1/3 mixtures, or else from mixtures obtained by nitration of anthraquinone, conversion into diphenoxy compounds, dinitration and saponification of the diphenoxy-dinitro compounds without separation of the isomers. The condensation products may be isolated by entraining the solvent in steam and filtering. They are then subjected to the action of a reducing agent such as sodium sulphide.

Dyestuffs of the general formula I are especially suitable for the colouration of fibres based on polyesters. By "fibres based on polyesters" we mean in general the fibres obtained by the polycondensation of diacids with dialcohols, and in particular those obtained by the condensation of terephthalic acid with ethylene glycol. Such fibres are known on the market, for example, by the names of "Terylene," "Tergal" and "Dacron." The dyestuffs according to the invention can be applied to these fibres by any of the processes already employed for the colouration of polyester fibres by means of other pigments. In particular, these fibres may be dyed under pressure at high temperature, with or without a vehicle, by means of aqueous dispersions of the dyestuffs; the fibres may also be foularded in these dispersions and then subjected to a treatment at high temperature, such as steaming under pressure. The fibres may be printed; the printed fibres are then subjected to a steaming under pressure. On the other hand, vigorous heat treatments are used when it is wished to obtain a permanent pleating of fabrics based on polyester fibres. For this reason, dyestuffs intended for the colouration of these fibres must possess excellent resistance to sublimation. The dyestuffs of the above formula which give bright blue shades not only have a good tinctorial yield and good general fastness, but also an excellent resistance to sublimation and to light. Even when they contain an unsubstituted sulphonamide group which imparts to them a certain amount of acidity, these dyestuffs have an excellent fastness to wet tests.

Dyestuffs of the general Formula I likewise have an excellent affinity for fibres based on cellulose esters such as cellulose diacetate and triacetate, and for fibres based on polyamides such as those which are known on the market by the names "nylon" and "Rislan"; they also dye polyvinyl fibres, such as for example that known by the name "Thermovyl," and polyacrylic fibres such as those known by the names "Orlon" and "Crylor."

The invention will be more clearly understood by reference to the following examples which are purely illustrative and in which the parts indicated are parts by weight.

Example 1

3 parts of 4:8-dinitro-anthrarufin, 6 parts of 3-amino-4-methoxy-N:N-diethyl-benzenesulphonamide and 50 parts of anhydrous nitrobenzene are introduced into an apparatus provided with a stirring device, a thermometer and a reflux condenser. The mixture is heated at 180° C. for 8 hours. The colour of the reaction mixture changes progressively to blue. When the reaction is ended, the solvent is entrained by steam and the residue is isolated by filtration. The excess amine is dissolved by the addition of 50 parts of 10% hydrochloric acid, and the blue powder which has precipitated is filtered off, washed and dried.

The powder is treated for an hour at 85–95° C. in 20 parts of a 10% aqueous solution of sodium sulphide. After diluting, the product resulting from the reduction is filtered, washed with water until the washings are neutral, and dried in the oven.

The dyestuff obtained is dispersed by dissolving in concentrated sulphuric acid and precipitating in water. The aqueous paste is ground in the presence of a dispersing agent and dried. When applied to polyester fibres, this dyestuff gives a bright blue shade.

Example 2

In this case one operates as in the process described in the preceding example, except that the 3-amino-4-methoxy-N:N-diethyl-benzenesulphonamide is replaced by the corresponding amount of 3-amino-4-methoxy-N-butyl-benzenesulphonamide. The polyester fibres are coloured a bright blue shade.

Example 3

5 parts of 4:8-dinitro-anthrarufin, 7.5 parts of m-amino-benzenesulphonamide and 60 parts of dry nitrobenzene are introduced into an apparatus provided with a stirring device, a thermometer and a reflux condenser. The mixture is boiled under reflux for 6 hours with stirring. The colour of the reaction mixture changes progressively from yellow to blue. At the end of the reaction, the solvent is entrained by steam. The product is filtered off in the hot and dried, and a reddish-blue powder remains.

The condensation product is reduced in the presence of 32 parts of a 5% aqueous solution of sodium sulphide for an hour at 90–95° C. After cooling, the dyestuff is precipitated from its aqueous solution by the addition of ammonium chloride, filtered off, washed and dried. The product is then dispersed by dissolving in concentrated sulphuric acid and diluting with water with vigorous stirring. The paste obtained after filtration and washing is subjected to prolonged grinding in the presence of a dispersing agent and a wetting agent. Drying is preferably effected in an atomiser.

After dyeing at 130° C. one obtains on "Tergal" a bright blue, full-bodied shade having excellent fastness. Its resistance to sublimation is very good.

If, instead of 4:8-dinitro-anthrarufin, 4:5-dinitro-chrysazin is employed, a dyestuff having the same properties, but with a rather more greenish shade, is obtained.

*Example 4*

Instead of using 4:8-dinitro-anthrarufin as in Example 3, the starting material is a mixture prepared as follows:

A mixture of several isomeric dinitro-anthraquinones, principally the 1:5- and the 1:8-dinitro-anthraquinones, is obtained by nitration of anthraquinone. This mixture is converted into diphenoxy derivatives by the action of phenol and caustic potash. After nitration and saponification, a mixture composed principally of 4:8-dinitro-anthrarufin and 4:5-dinitro-chrysazin is finally formed. By condensing 10 parts of this product with 15 parts of m-aminobenzene-sulphonamide under the conditions given in Example 3, a mixture of dyestuffs is obtained in excellent yield which, after reduction by sodium sulphide, dyes "Tergal" giving shades which have excellent fastness and which are more full-bodied than those given by its components used separately.

*Example 5*

10 parts of 4:8-dinitro-anthrarufin, 15 parts of p-amino-benzenesulphonamide and 120 parts of dry nitrobenzene are introduced into an apparatus provided with a stirring device, a thermometer and a reflux condenser. The mixture is boiled for 8 to 9 hours with agitation. After entraining the solvent with steam, the residue is filtered. The product is first treated with 100 parts of 5% hydrochloric acid, then, after filtration and washing, with 100 parts of a 5% solution of sodium carbonate, with subsequent filtering off and washing. The filter cake is treated with a 5% solution of sodium hydrosulphide for an hour at 90–95° C., and the product is then isolated. The dyestuff gives a full-bodied blue shade of beautiful brilliancy on "Tergal" which possesses good fastness to sublimation and to light.

On starting from 4:5-dinitro-chrysazin, a blue dyestuff having the same properties is obtained.

On the other hand, on employing a mixture of 4:8-dinitro-anthrarufin and 4:5-dinitro-chrysazin prepared by the process of Example 4, a mixture of dyestuffs is obtained which on "Tergal" provides shades which are more full-bodied than those given by its components used separately.

*Example 6*

An intimate mixture of 5 parts of 4:5-dinitro-anthrarufin and 25 parts of m-amino-benzenesulphonamide is melted and then progressively heated to 165° C. in an apparatus provided with a stirring device and a thermometer. The mixture is maintained at 165° C. for 30 minutes, and then heated for 15 minutes at 170° C. It is allowed to cool to 100–110° C., and a mixture of alcohol and hydrochloric acid is slowly added in order to dissolve excess amine. The solid is then filtered off, washed until the washings are neutral and dried. The product obtained is then reduced under the conditions mentioned in Example 3. A dyestuff identical with that described in Example 3 is obtained.

*Example 7*

0.5 part of the crude dyestuff of Example 3 is dissolved in 10 parts of concentrated sulphuric acid at ordinary room temperatures; this solution is introduced into a mixture of water and ice, and the precipitate is filtered off and washed. The paste thus obtained is ground in a bar mill with one part of sodium methylene-dinaphthylsulphonate. The dispersion thus obtained is poured into a dyebath composed of 3000 parts of water and 6 parts of Marseilles soap. The bath is heated to 40° C. and 100 parts of cellulose diacetate yarn are introduced; it is then heated progressively to 80° C. and kept for an hour at a temperature between 80° and 85° C. A blue shade of beautiful brilliancy is obtained which is fast to light and to flue gases.

*Example 8*

0.5 part of the mixture of crude dyestuffs described in Example 4 is dissolved in 10 parts of concentrated sulphuric acid at ordinary room temperature. The solution is introduced into a mixture of water and ice, and the precipitate is filtered off and washed. The paste thus obtained is ground in a bar mill with one part of sodium methylene-dinaphthylsulphonate. The dispersion obtained is poured into a dyebath containing 3000 parts of water and 6 parts of Marseilles soap; the bath is heated to 40° C. and 100 parts of cellulose acetate yarn are introduced, and it is then heated progressively to 80° C. and a temperature between 80 and 85° C. is maintained for an hour. A blue shade of beautiful brilliancy is obtained which is distinctly more full-bodied than that obtained with each of the constituents of the mixture used separately.

*Example 9*

0.5 part of the crude dyestuff described in Example 3 is dissolved in 10 parts of concentrated sulphuric acid at ordinary room temperature. The solution is introduced into a mixture of water and ice, and the precipitate is filtered off and washed. The paste obtained is ground in a bar mill with one part of sodium methylene-dinaphthylsulphonate. The dispersion thus obtained is poured into a dyebath containing 3000 parts of water and 5 parts of a condensation product of ethylene oxide with a fatty alcohol. 100 parts of "nylon" are introduced at 55–60° C. into the bath thus prepared and the temperature of the latter is raised to 80–85° C. and maintained at this temperature for an hour. The "nylon" is dyed a beautiful blue shade of good fastness.

*Example 10*

100 parts of "Thermovyl" are dyed in a bath containing one part of the dyestuff described in Example 5 and dispersed as in the preceding examples. Dyeing is carried out at 90–95° C. for an hour in the presence of one gram per litre of a condensation product of ethylene oxide with a fatty alcohol. A blue shade is obtained.

*Example 11*

100 parts of "Orlon" are dyed in an autoclave at 130° C. for an hour with one part of the dyestuff described in Example 3, dispersed as in the preceding examples. A blue shade is obtained.

*Example 12*

5 parts of the mixture of crude dyestuffs described in Example 4 are finely ground until particles of size less than 5μ are obtained. 10,000 parts of polystyrene grains are mixed with the 5 parts of the dyestuff mixture thus prepared and the grains thus covered with dyestuffs are introduced into an injection press for the manufacture of moulded articles. Articles of a beautiful transparent blue are obtained. The dyes are very stable to heat and dissolved in the polystyrene they resist a temperature of 300° C. for 50 minutes.

We claim:
The dyestuffs of the formula:
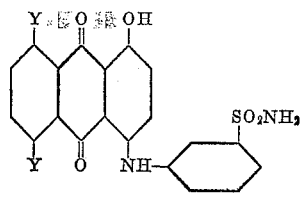
in which one Y represents a hydroxyl group and the other Y an amino group.
References Cited in the file of this patent
UNITED STATES PATENTS
2,480,269   Seymour et al. _____ Aug. 30, 1949
2,704,292   Hoefle et al. _____ Mar. 15, 1955